US009220036B2

(12) United States Patent
Ramachandran et al.

(10) Patent No.: US 9,220,036 B2
(45) Date of Patent: Dec. 22, 2015

(54) SYSTEM, APPARATUS, AND METHOD FOR CIRCUIT SWITCHED FALLBACK RELIABILITY IN WIRELESS COMMUNICATION SYSTEMS

(75) Inventors: Shyamal Ramachandran, San Diego, CA (US); Thomas Klingenbrunn, San Diego, CA (US); Miguel Griot, San Diego, CA (US)

(73) Assignee: QUALCOMM Incorporated, San Deigo, CA (US)

( * ) Notice: Subject to any disclaimer, the term of this patent is extended or adjusted under 35 U.S.C. 154(b) by 242 days.

(21) Appl. No.: 13/165,694

(22) Filed: Jun. 21, 2011

(65) Prior Publication Data
US 2011/0317659 A1 Dec. 29, 2011

Related U.S. Application Data

(60) Provisional application No. 61/357,895, filed on Jun. 23, 2010.

(51) Int. Cl.
*H04W 36/00* (2009.01)
*H04W 60/04* (2009.01)

(52) U.S. Cl.
CPC .......... *H04W 36/0022* (2013.01); *H04W 60/04* (2013.01)

(58) Field of Classification Search
CPC combination set(s) only.
See application file for complete search history.

(56) References Cited

U.S. PATENT DOCUMENTS

| 2010/0098023 A1* | 4/2010 | Aghili et al. ................. 370/331 |
| 2010/0165940 A1* | 7/2010 | Watfa et al. .................. 370/329 |
| 2010/0220680 A1* | 9/2010 | Ramankutty et al. ......... 370/329 |
| 2011/0090848 A1* | 4/2011 | Kim et al. .................... 370/328 |
| 2011/0207462 A1* | 8/2011 | Hallenstal et al. ............ 455/436 |

FOREIGN PATENT DOCUMENTS

| CN | 101616395 A | 12/2009 |
| EP | 2291014 A1 | 3/2011 |
| JP | 2010093455 A | 4/2010 |
| JP | 2011527537 A | 10/2011 |

OTHER PUBLICATIONS

3rd Generation Partnership Project; Technical Specification Group Services and System Aspects; Circuit Switched (CS) fallback in Evolved Packet System (EPS); Stage 2 (Release 10), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V10.0.0, Jun. 10, 2010, pp. 1-73, XP050441566, [retrieved on Jun. 10, 2010].

(Continued)

*Primary Examiner* — Ian N Moore
*Assistant Examiner* — Eric H Wang
(74) *Attorney, Agent, or Firm* — Arent Fox LLP

(57) ABSTRACT

In accordance with aspects of the disclosure, a method, apparatus, and computer program product are provided for wireless communication. The method, apparatus, and computer program product may be configured to determine that a device is switching from a first cell and a first location to a second cell and a second location to implement a mobile terminated circuit switched fallback process, generate a routing area update message including a flag indicating a pending data packet for communication, and transmit the generated routing area update message.

32 Claims, 11 Drawing Sheets

(56) References Cited

OTHER PUBLICATIONS

Alcatel-Lucent: "MT CSFB roaming retry potential issue", 3GPP Draft; S2-102407_Discussion on MT CSFB Roaming Retry Issue_V3, 3rd Generation Partnership Project (3GPP), Mobile Competence Centre; 650, Route Des Lucioles; F-06921 Sophia-Antipolis Cedex; France, vol. CT WG1, No. Dublin; 20100702, Jun. 16, 2010, XP050409979, [retrieved on Jun. 16, 2010].

International Search Report and Written Opinion—PCT/US2011/041508, ISA/EPO—Sep. 12, 2011.

Qualcomm Incorporated: "GCG Priority 3—Addition of new multi-layer test case 13.1.3", 3GPP Draft; R5-101169_Revision_of_101055, 3rd Generation Partnership Project (3GPP), Mobile Competence Centre; 650, Route Des Lucioles; F-06921 Sophia-Antipolis Cedex; France, vol. RAN WG5, no. San Francisco; 20100222, Feb. 27, 2010, XP050429447, [retrieved on Feb. 27, 2010].

NEC: "Correction to the roaming retry in CSFB for MT call," 3GPP Draft; S2-102186 Correction to the Roaming Retry in CSFB for MT Call, 3rd Generation Partnership project (3GPP), Mobile Competence Centre; 650, Route Des Lucioles; F-06921 Sophia-Antipolis Cedex; France, vol. SA WG2, No. Kyoto; 20100510, May 4, 2010, 10 pages, XP050434401, [retrieved on May 4, 2010].

Notification of the First Office Action for Chinese patent application No. 201180040735.1 dated Feb. 10, 2015, pp. 1-14.

European Office Action dated Apr. 27, 2015, for European Patent Application No. 11729004.9-1854, 8 pages.

Notice of Allowance for Korean Application No. 10-2013-7001800, dated Apr. 27, 2015, 3 pages.

Qualcomm Europe, "RAU trigger during CSFB with redirection", 3GPP Draft; C1-093526, RAU CSFB, 3rd Generation Partnership Project (3GPP), Mobile Competence Centre; 650, Route Des Lucioles; F-06921, Sophia-Antipolis; France, No. Sevilla; 20090824, Aug. 24, 2009, XP050382481, pp. 1-5. [retrieved on Aug. 31, 2009].

* cited by examiner

SYSTEM, APPARATUS, AND METHOD FOR CIRCUIT SWITCHED FALLBACK RELIABILITY IN WIRELESS COMMUNICATION SYSTEMS

CROSS-REFERENCE TO RELATED APPLICATION(S)

This application claims priority to and the benefit of U.S. Provisional Application Ser. No. 61/357,895, entitled "Method and Apparatus for Improving Circuit Switched Fallback Reliability," filed on Jun. 23, 2010, which is expressly incorporated herein by reference in its entirety.

BACKGROUND

1. Field

The present disclosure relates generally to communication and, more specifically, to techniques for supporting Circuit Switched Fallback (CSFB) in Long Term Evolution (LTE) network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and worldwide interoperability for microwave access (WiMAX).

For wireless communication systems, these multiple-access technologies have been adopted in various telecommunication standards to provide a common protocol that enables different wireless devices to communicate on a municipal, national, regional, and even global level. An example of an emerging telecommunication standard is Long Term Evolution (LTE). LTE provides a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards utilizing OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with an aspect of the disclosure, a method for wireless communication comprises determining that a device is switching from a first cell and a first location to a second cell and a second location to implement a mobile terminated circuit switched fallback process, generating a routing area update message including a flag indicating a pending data packet for communication, and transmitting the generated routing area update message.

In accordance with an aspect of the disclosure, an apparatus for wireless communication comprises a processing system configured to determine that a device is switching from a first cell and a first location to a second cell and a second location to implement a mobile terminated circuit switched fallback process, generate a routing area update message including a flag indicating a pending data packet for communication, and transmit the generated routing area update message.

In accordance with an aspect of the disclosure, an apparatus for wireless communication comprises means for determining that a device is switching from a first cell and a first location to a second cell and a second location to implement a mobile terminated circuit switched fallback process, means for generating a routing area update message including a flag indicating a pending data packet for communication, and means for transmitting the generated routing area update message.

In accordance with an aspect of the disclosure, a computer program product comprises a computer-readable medium comprising code executable to cause an apparatus to determine that a device is switching from a first cell and a first location to a second cell and a second location to implement a mobile terminated circuit switched fallback process, generate a routing area update message including a flag indicating a pending data packet for communication, and transmit the generated routing area update message.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
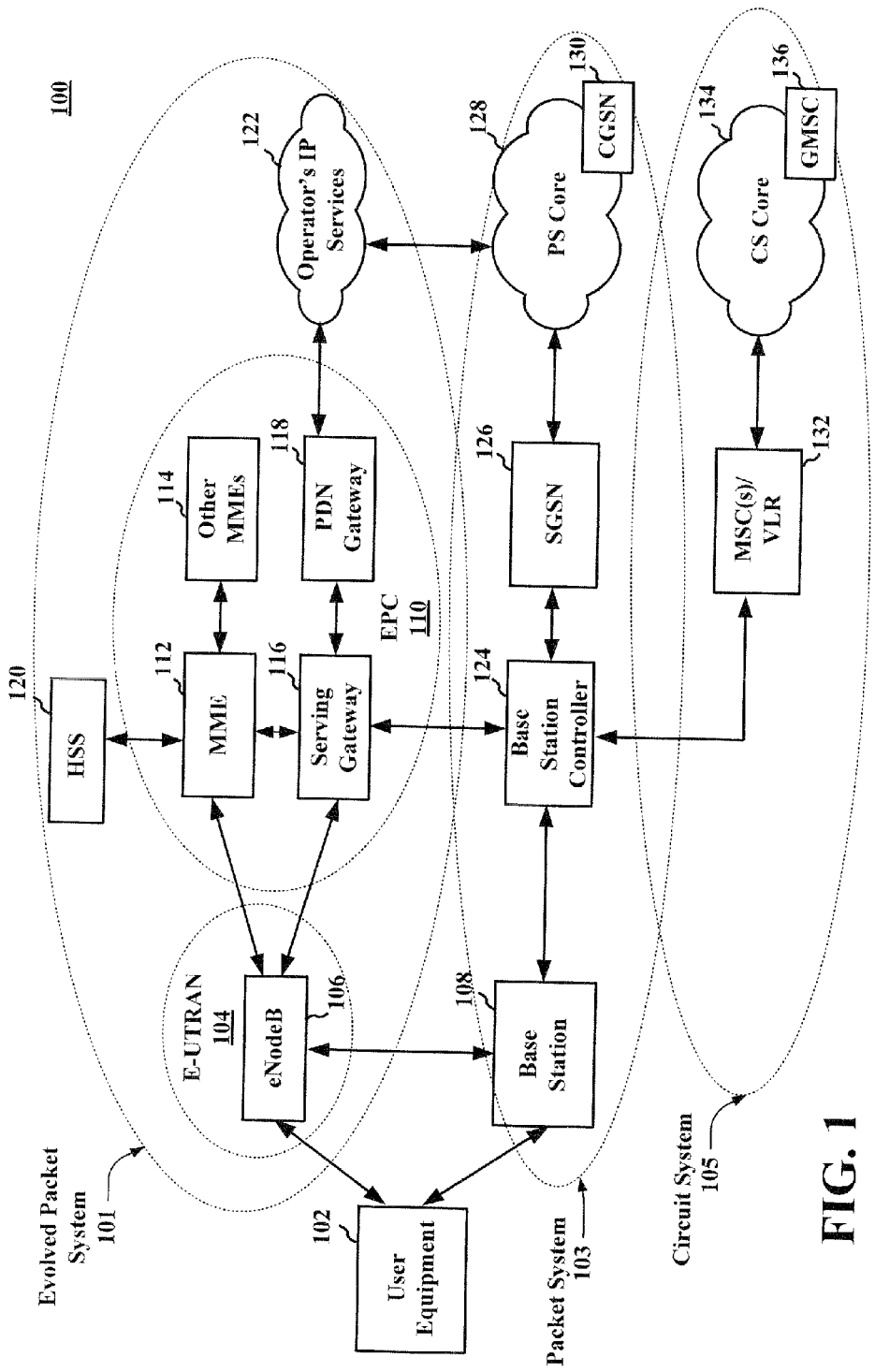
FIG. 1 shows a diagram illustrating a wireless communication network, in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In an aspect of the disclosure, a wireless multiple-access communication system is configured to simultaneously support communication for multiple wireless terminals. Each terminal communicates with one or more base stations via transmissions on the forward and reverse links. The forward link or DL refers to the communication link from the base stations to the terminals, and the reverse link or UL refers to the communication link from the terminals to the base stations. This communication link may be established via a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

As provided herein, aspects of the disclosure are directed to improving reliability of Mobile Terminated (MT) Circuit Switched Fallback (CSFB) calls by ensuring that User Equipment (UE) receives pages for MT in scenarios where CSFB procedures encounter Location Are (LA) change.

In an aspect of the disclosure, a wireless communication system may include UE that may be associated with a first network and may access additional and/or different resources from a second network. For example, a UE may be camped on an LTE cell and may access voice calls through a CS based cell. Where the CS based cell is associated with a Mobile Switching Centre (MSC) other than an MSC associated with the LTE cell, then additional procedures may be used to assure paging communications reach the UE. The MSCs may be physically at the same location (e.g., same switching office), but the MSCs may provide coverage to different geographical areas. These areas may be referenced to Location Areas (LAs).

In an example, a CSFB UE may receive a page for an MT CSFB call while on Evolved UMTS Terrestrial Radio Access Network (E-UTRAN). The UE may then be moved to UTRAN or GERAN to perform MT call setup. However, if the UE finds that the target UTRAN/GERAN cell is being served by a different Mobile Switching Centre (MSC) than the one that initially paged the UE, then there is a risk that the UE may lose the page. In some instances, the MT call may be lost. To improve reliability, aspects of the disclosure enable the UE to assist the UTRAN/GERAN network in ensuring that the UE is re-paged for the MT call.

FIG. 1 is a diagram illustrating a wireless network architecture 100 employing various apparatuses. The network architecture 100 may include an Evolved Packet System (EPS) 101. The EPS 101 may include one or more UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS may interconnect with other access networks, such as a packet switched core (PS core) 128, a circuit switched core (CS core) 134, etc. As shown, the EPS provides packet-switched services, however, as those skilled in the art will readily appreciate, the various concepts presented throughout this disclosure may be extended to networks providing circuit-switched services, such as the network associated with CS core 134.

The network architecture 100 may further include a packet switched network 103 and a circuit switched network 105. In an implementation, the packet switched network 103 may include base station 108, base station controller 124, Serving GPRS Support Node (SGSN) 126, PS core 128 and Combined GPRS Service Node (CGSN) 130. In another implementation, the circuit switched network 105 may include base station 108, base station controller 124, MSC, Visitor location register (VLR) 132, CS core 134 and Gateway Mobile Switching Centre (GMSC) 136.

The E-UTRAN 104 may include an evolved Node B (eNB) 106 and connection to other networks, such as packet and circuit switched networks may be facilitated through base station 108. The eNB 106 provides user and control plane protocol terminations toward the UE 102. The eNB 106 may be connected to the other eNBs 108 via an X2 interface (i.e., backhaul). The eNB 106 may also be referred to by those skilled in the art as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 include the Internet, the Intranet, an IP Multimedia Subsystem (IMS), and a PS Streaming Service (PSS).

In an aspect of the disclosure, the wireless system 100 may be enabled to facilitate CS fallback (CSFB). As used herein, CSFB may refer to establishing a signaling channel between a circuit switched MSC 132 and the LTE core network 110 to allow for services, such as voice calls, short message service (SMS), etc. In such an aspect, CSFB may be enabled when a UE 102 is associated with EPS 101 (e.g., camped on the LTE network 101) and registered to receive pages for mobile terminated (MT) calls on the LTE network 101. In operation, the UE 102 may receive a page on the LTE network 101. Thereafter, the UE 102 may be transitioned by the LTE network 101 to a CS based cell 108 (e.g., a UTRAN cell, GERAN cell, etc.) to perform CS call setup. In an implementation, CS call setup may be performed using a page response message. As implemented through a LTE network 101, CSFB may be different from legacy CS call set up on native CS based cells 108 (e.g., UTRAN/GERAN) in that the UE 102 may receive a page for an MT call on one cell and may respond to the page on another cell.

Generally, while camped on the LTE network 101, a CSFB capable UE 102 may be attached to a 3GPP MSC 132. This 3GPP MSC 132 may serve a first location area, e.g. LA1. As noted above, MT CSFB call processing may involve the UE being moved from LTE network 101, where a page was received, to CS based cell 108 (e.g., a UTRAN cell, GERAN cell, etc.) where a page response may be sent.

In an aspect of the disclosure, in certain network border regions, it may be possible that the UE 102 is moved from LTE cell 101 to a CS based cell 108 being serviced by a different MSC (e.g., MSC2) than the one that the UE was connected to over LTE. Therefore the UE's location area may change to LA2. In such an aspect, a page response sent by the UE 102 in LA2 will not be properly processed by the new MSC, e.g. MSC2, for a page received in LA1. In other words, in the scenario where a UE camped on the LTE cell 101, and associated with a first MSC, e.g. MSC1, receives a page for an MT call, and then the UE experiences a mobility event, e.g.

moving to a new cell supported by a new MSC, e.g. MSC2, prior to being able to respond to the page, then a page response sent by the UE to MSC2 will not be properly processed because MSC2 has no knowledge of the page. In an implementation, for an MT call to be processed successfully, the UE 102 may be paged again on LA2 by MSC2. This paging from MSC2 may be achieved through a Roaming Retry procedure, wherein UE 102 may perform location updating on MSC2 to LA2 that results in MSC2 informing the GMSC 136 of the admission of the UE 102 in LA2. GMSC 136 may then cancel paging at MSC1 and request MSC2 to page the UE 102.

Additionally or in the alternative, when the UE 102 performs a location updating procedure on LA2, the MSC2 may not be aware that the UE 102 has moved to LA2 as a result of a page received from MSC1. So MSC2 may perform a location updating procedure and instruct the radio access network (RAN) network 105 (e.g., CS network) to release the connection. The CS network 105 may release the connection since the UE 102 is a CSFB UE that is LTE capable, so the CS network 105 may have implemented reselection or redirection policies that simply redirect the UE to LTE 101 as soon as MSC2 requests a connection release. If this happens, the UE 102 may be transferred back to the MSC1 E-UTRAN (in LA1) and the page that was originally received may be lost. As such, for the Roaming Retry procedure to result in paging the UE 102 again on LA2, the MSC2 may ensure that the UE 102 is not inadvertently returned to LTE. In other words, MSC2 may not request the CS based network 105 to release the connection to the UE after completing the location updating procedure. Instead MSC2 may allow the connection to be maintained so that the UE 102 may be available when a page arrives. Note, in such an aspect, the MSC2 may not be aware at the time of location updating that the UE 102 has a pending page in LA1, which might get re-routed to LA2. Further note, in such an aspect, the UE 102 may not use a "Follow-on Request" flag in the Locating update request message, because the Follow-on Request flag may improperly indicate to MSC2 that the UE 102 is about to originate a mobile originated (MO) call, and as such, the MSC2 might forward any incoming pages to voice mail, or might even indicate a "busy tone" to the calling party, any of which would result in the MT page being lost. Further discussion of processes that allow the UE 102 to receive a page at a second MSC (e.g., MSC2) are provided with reference to FIGS. 5, 6A, and 6B.

Figure 2:
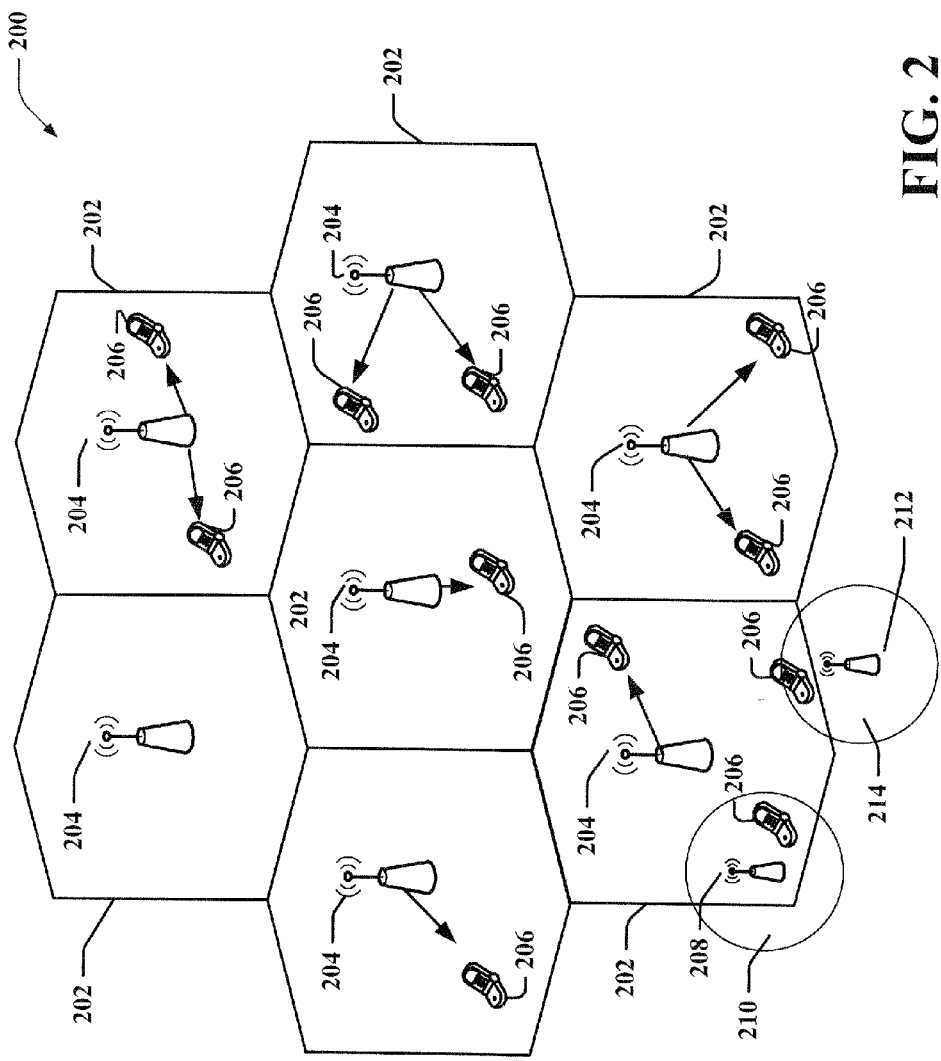
FIG. 2 shows a diagram illustrating an access network, in accordance with aspects of the disclosure.

FIG. 2 is a diagram illustrating an example of an access network in an LTE network architecture. In this example, the access network 200 is divided into a number of cellular regions (cells) 202. One or more lower power class eNBs 208, 212 may have cellular regions 210, 214, respectively, that overlap with one or more of the cells 202. The lower power class eNBs 208, 212 may be femto cells (e.g., home eNBs (HeNBs)), pico cells, or micro cells. A higher power class or macro eNB 204 is assigned to a cell 202 and is configured to provide an access point to the EPC 110 for all the UEs 206 in the cell 202. There is no centralized controller in this example of an access network 200, but a centralized controller may be used in alternative configurations. The eNB 204 is responsible for all radio related functions including radio bearer control, admission control, mobility control, scheduling, security, and connectivity to the serving gateway 216 (e.g., see FIG. 1).

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 2rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 204 may have multiple antennas supporting MIMO technology. The use of MIMO technology enables the eNB 204 to exploit the spatial domain to support spatial multiplexing, beamforming, and transmit diversity.

Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream and then transmitting each spatially precoded stream through a different transmit antenna on the downlink. The spatially precoded data streams arrive at the UE(s) 206 with different spatial signatures, which enables each of the UE(s) 226 to recover the one or more data streams destined for that UE 206. On the uplink, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 3:
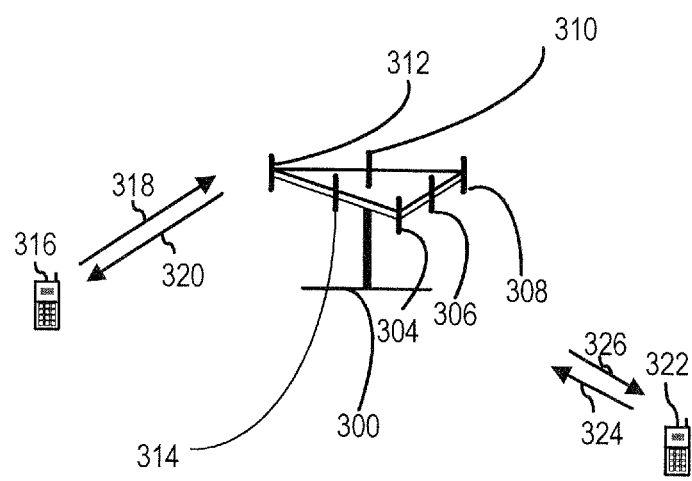
FIG. 3 shows a diagram illustrating an embodiment of a multiple access wireless communication system, in accordance with aspects of the disclosure.

FIG. 3 shows a diagram illustrating an embodiment of a multiple access wireless communication system, in accordance with aspects of the disclosure. In an implementation, an access point (AP) 300 includes one or more antenna groups, for example, one including 304 and 306, another including 308 and 310, and an additional including 312 and 314. In FIG. 3, only two antennas are shown for each antenna group; however, more or fewer antennas may be utilized for each antenna group. The access terminal 316 (AT) is in communication with the antennas 312 and 314, where the antennas 312 and 314 transmit information to the access terminal 316 over the forward link or downlink (DL) 320 and receive information from the access terminal 316 over the reverse link or uplink (UL) 318. The access terminal 322 is in communication with the antennas 306 and 308, where the antennas 306 and 308 transmit information to the access terminal 322 over the forward link or DL 326 and receive information from the access terminal 322 over the reverse link or UL 324.

In an aspect of the disclosure, in a frequency division duplexing (FDD) system, the communication links 318, 320, 324 and 326 may use different frequency for communication. For example, the forward link or DL 320 may use a different frequency then that utilized by the reverse link or UL 318.

In an aspect of the disclosure, each group of antennas and/or the area in which they are designed to communicate may be referred to as a sector of the access point. In an example, each antenna group may be designed to communicate to access the terminals in a sector of the areas covered by the access point 300.

When communicating over the forward links or DLs 320, 326, the transmitting antennas of the access point 300 utilize beam forming to improve a signal-to-noise ratio of the forward links or downlinks 320, 326 for the different access terminals 316 and 324, respectively. Also, an access point utilizing beamforming to transmit to access terminals scattered randomly through its coverage causes less interference to access terminals in neighboring cells than an access point transmitting through a single antenna to all its access terminals.

In accordance with aspects of the disclosure, an access point may comprise a fixed station utilized for communicating with the terminals and may be referred to as an access point (AP), a Node B (NB), evolved Node B (eNB), or some other terminology. An access terminal may be referred to as an access terminal (AT), user equipment (UE), a wireless communication device, terminal, or some other terminology. Moreover, an access point may be a macrocell access point, femtocell access point, picocell access point, and/or the like.

In various embodiments, as described herein, one or more segments or one or more extension carriers may be linked to a regular carrier resulting in a composite bandwidth over which the UE may transmit information to, and/or receive information from, the eNB.

In the description that follows, various aspects of an access network will be described with reference to a MIMO system supporting OFDM on downlink (DL) and SC-FDMA on uplink (UL). OFDM is a spread-spectrum technique that modulates data over a number of subcarriers within an OFDM symbol. The subcarriers are spaced apart at precise frequencies. The spacing provides "orthogonality" that enables a receiver to recover data from subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4A:
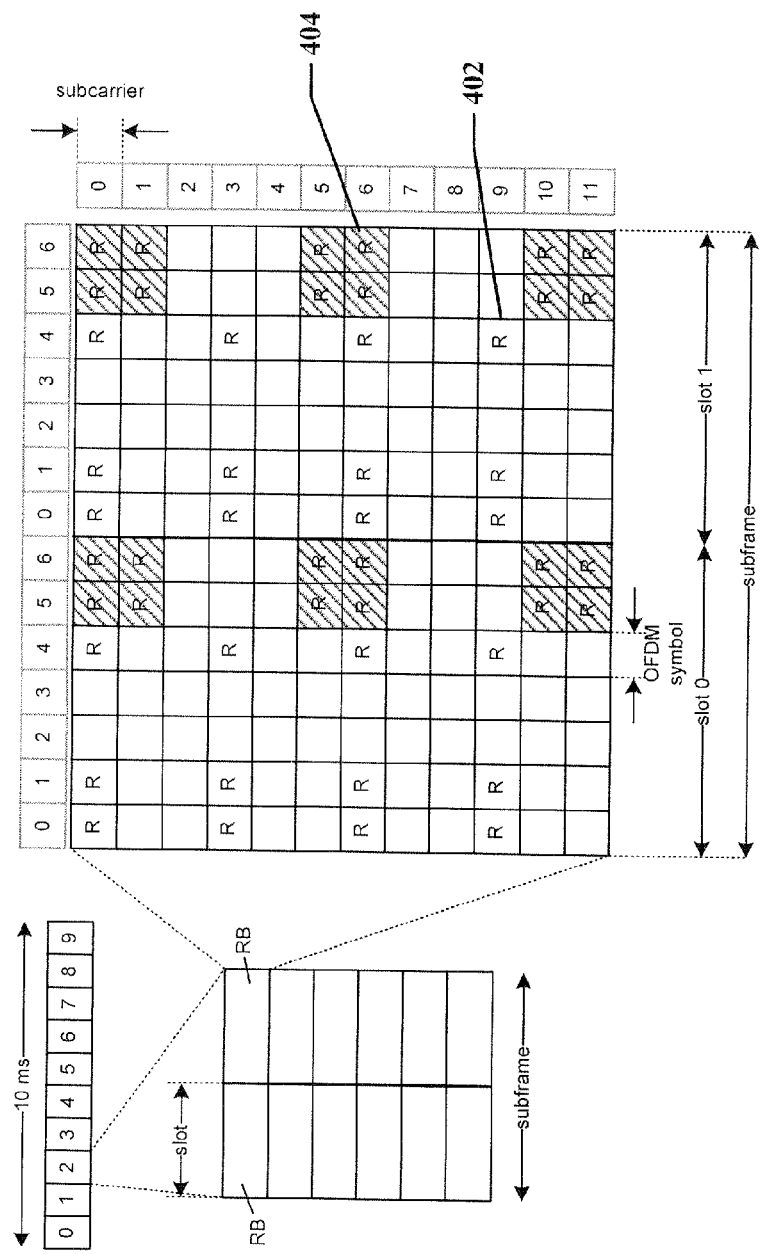
FIG. 4A is a diagram illustrating an example of a frame structure for use in an access network, in accordance with aspects of the disclosure.

In accordance with aspects of the disclosure, various frame structures may be utilized to support DL and UL transmissions. An example of a DL frame structure will now be presented with reference to FIG. 4A. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

In an implementation, a resource grid may be utilized to represent two time slots, each time slot including a Resource Block (RB). The resource grid is divided into multiple Resource Elements (REs). In LTE, a RB may include 12 consecutive subcarriers in the frequency domain and, for a normal cyclic prefix in each OFDM symbol, 7 consecutive OFDM symbols in the time domain, or 84 Resource Elements (REs). Some of the REs, as indicated as R 402 and 404, may include DL Reference Signals (DL-RS). The DL-RS include Cell-specific RS (CRS) (which may be referred to as common RS) 402 and UE-specific RS (UE-RS) 404. UE-RS 404 may be transmitted only on the RBs upon which a corresponding Physical Downlink Shared CHannel (PDSCH) is mapped. The number of bits carried by each RE may depend on the modulation scheme. As such, the more RBs that a UE receives and the higher the modulation scheme, the higher the data rate for the UE.

Figure 4B:
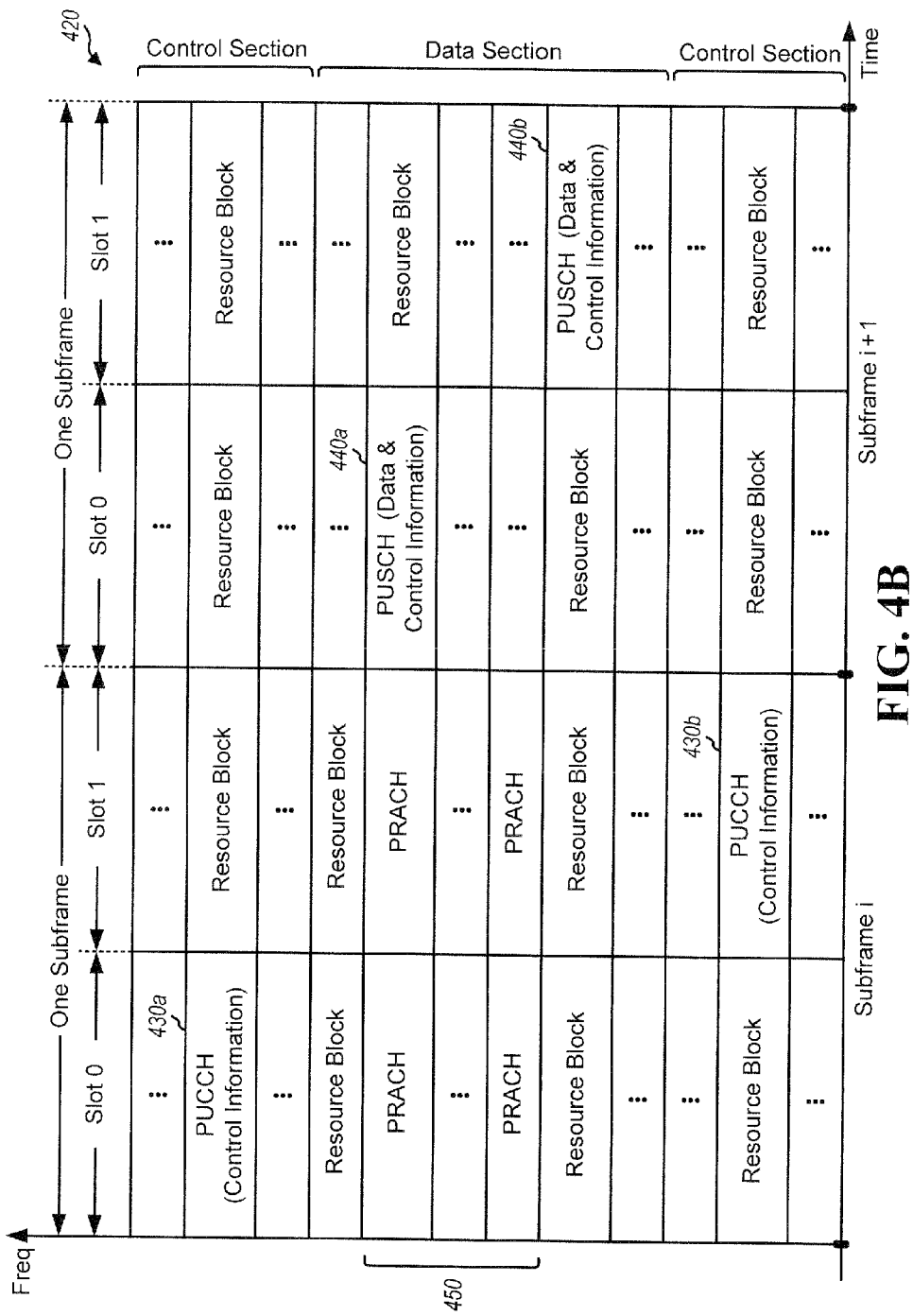
FIG. 4B shows an exemplary format for an uplink (UL) in a Long Term Evolution (LTE) network, in accordance with aspects of the disclosure.

Referring, to FIG. 4B, an example of a UL frame structure 420 is provided in an embodiment of a format for the UL in LTE. Available Resource Blocks (RBs) for the UL may be partitioned into a data section and a control section. The control section may be formed at the two edges of the system bandwidth and may have a configurable size. The RBs in the control section may be assigned to UEs for transmission of control information. The data section may include RBs not included in the control section. The design in FIG. 4B results in the data section including contiguous subcarriers, which may allow a single UE to be assigned one or more of the contiguous subcarriers in the data section.

In an implementation, a UE may be assigned RBs 430a, 430b in a control section to transmit control information to an eNB. The UE may be assigned RBs 440a, 440b in a data section to transmit data to the eNB. The UE may transmit control information in a Physical Uplink Control CHannel (PUCCH) on the assigned RBs in the control section. The UE may transmit only data or both data and control information in a Physical Uplink Shared CHannel (PUSCH) on the assigned RBs in the data section. A UL transmission may span both slots of a subframe and may hop across frequency, in a manner as shown in FIG. 4B.

In an aspect of the disclosure, referring to FIG. 4B, a set of RBs may be utilized to perform initial system access and achieve UL synchronization in a Physical Random Access CHannel (PRACH) 450. The PRACH 450 is configured to carry a random sequence and cannot carry any UL data/signaling. Each random access preamble occupies bandwidth corresponding to six consecutive RBs. The starting frequency may be specified by the network. That is, the transmission of the random access preamble is restricted to certain time and frequency resources. There is no frequency hopping for the PRACH. The PRACH attempt is carried in a single subframe (1 ms), and a UE may make only a single PRACH attempt per frame (10 ms).

In an aspect of the disclosure, it should be appreciated that the PUCCH, PUSCH, and PRACH in LTE are described in reference to 3GPP TS 36.211, entitled "Evolved Universal Terrestrial Radio Access (E-UTRA); Physical Channels and Modulation," which is publicly available.

Figure 4C:
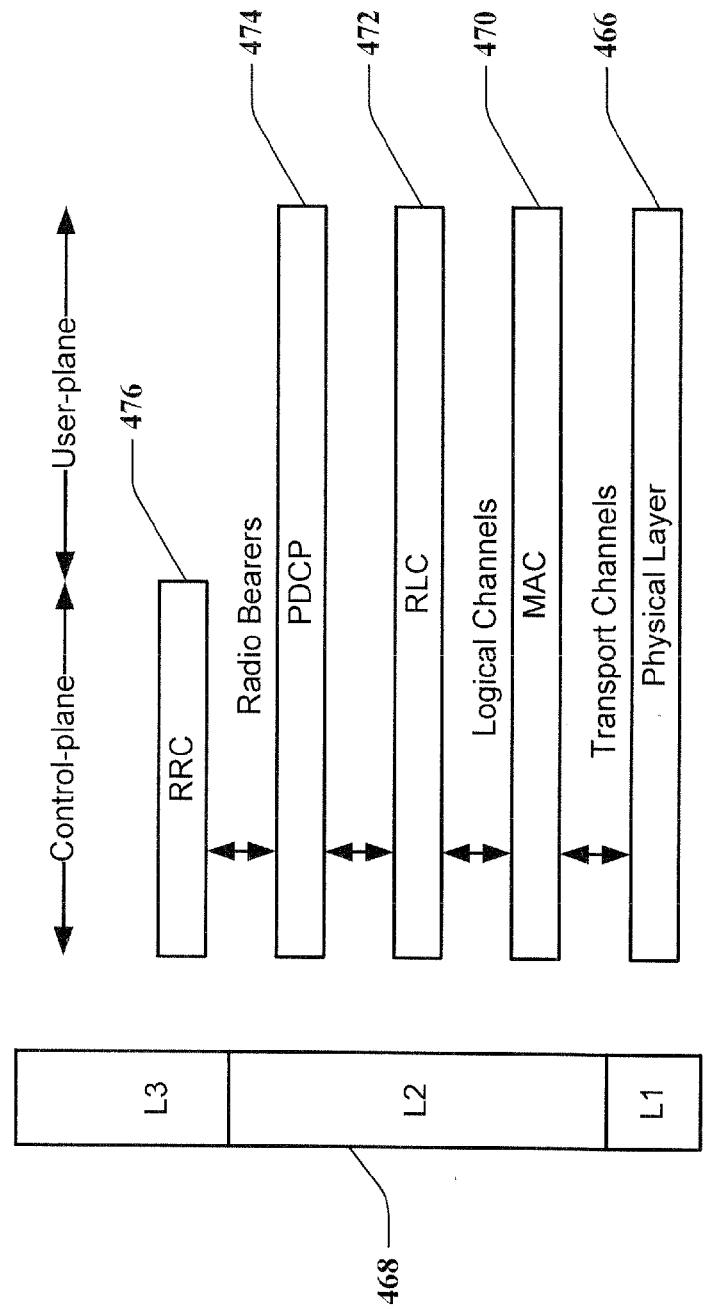
FIG. 4C is a diagram illustrating an example of a radio protocol architecture for the user and control plane, in accordance with aspects of the disclosure.

The radio protocol architecture may take on various forms depending on the particular application. An example for an LTE system will now be presented with reference to FIG. 4C. In an aspect of the disclosure, FIG. 4C is a diagram illustrating an example of the radio protocol architecture for the user and control planes. Referring to FIG. 4C, the radio protocol architecture for the UE and the eNB is shown with three layers: Layer 1 (L1), Layer 2 (L2), and Layer 3 (L3). L1 is the lowest layer and implements various physical layer signal processing functions. L1 is referred to herein as a physical layer 466. L2 468 is above the physical layer (L1) 466 and is responsible for the link between the UE and eNB over the physical layer (L1) 466.

In the user plane, the L2 layer 468 includes a media access control (MAC) sublayer 470, a radio link control (RLC) sublayer 472, and a Packet Data Convergence Protocol (PDCP) 474 sublayer, which are terminated at the eNB on the network side. Although not shown, the UE may have several upper layers above the L2 layer 468 including a network layer (e.g., IP layer) that is terminated at the PDN gateway 118 (e.g., see FIG. 1) on the network side, and an application layer that is terminated at the other end of the connection (e.g., far end UE, server, etc.).

In an aspect of the disclosure, the PDCP sublayer 474 provides multiplexing between different radio bearers and logical channels. The PDCP sublayer 474 may provide header compression for upper layer data packets to reduce radio transmission overhead, security by ciphering the data packets, and/or handover support for UEs between eNBs. The RLC sublayer 472 provides segmentation and reassembly of upper layer data packets, retransmission of lost data packets, and/or reordering of data packets to compensate for out-of-order reception due to Hybrid Automatic Repeat Request (HARQ). The MAC sublayer 470 provides multiplexing between logical and transport channels, and the MAC sublayer 470 is responsible for allocating the various radio resources (e.g., RBs) in one cell among the UEs. The MAC sublayer 470 is responsible for HARQ operations.

In the control plane, the radio protocol architecture for the UE and eNB is substantially the same for the physical layer 466 and the L2 layer 468 with the exception that there is no header compression function for the control plane. The control plane includes a Radio Resource Control (RRC) sublayer 476 in Layer 3. The RRC sublayer 476 is responsible for obtaining radio resources (i.e., radio bearers) and for configuring the lower layers utilizing RRC signaling between the eNB and the UE.

Figure 5:
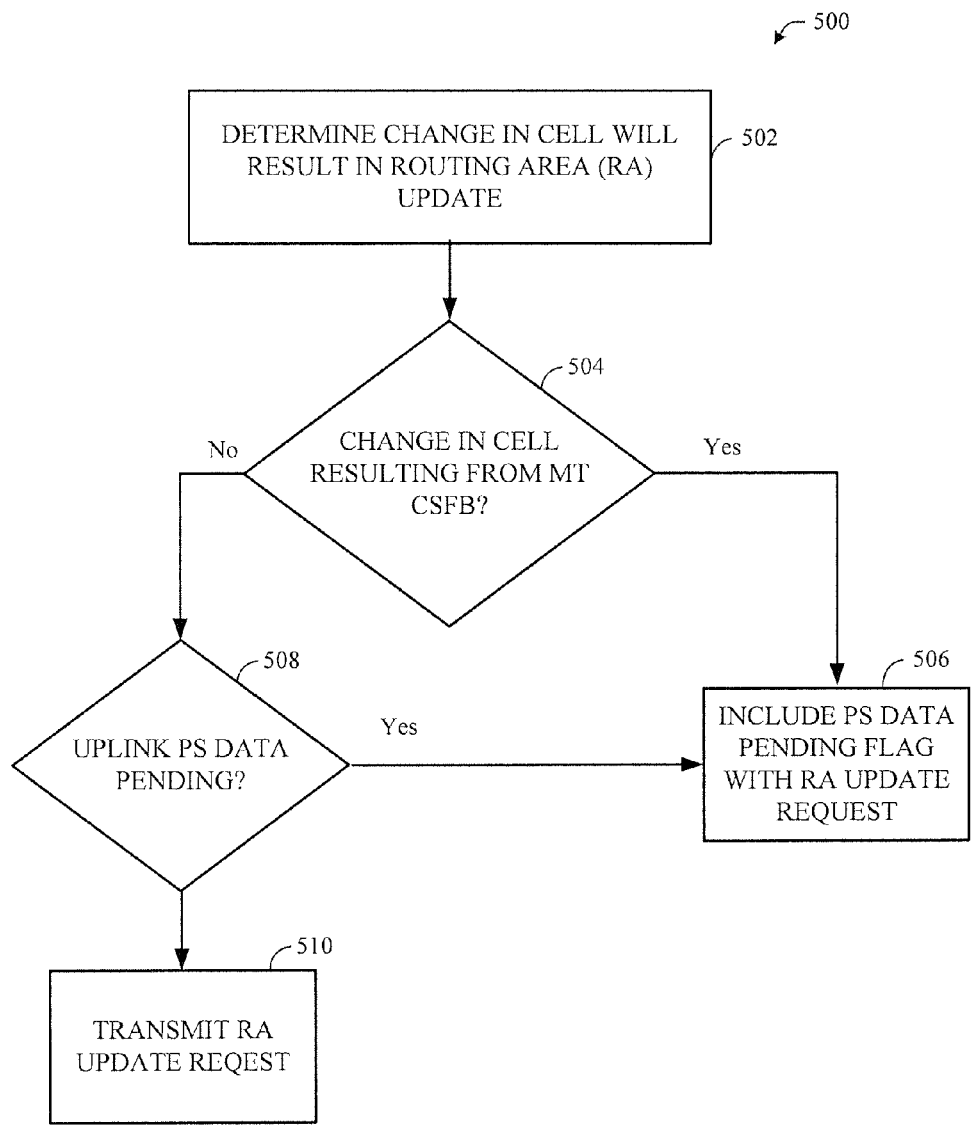
FIG. 5 shows a diagram illustrating a process flow of a communication network, in accordance with aspects of the disclosure.

FIG. 5 illustrates various methodologies in accordance with aspects of the disclosure. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 5 shows a diagram illustrating a system 500 that may include a UE and a multiple cells, in accordance with aspects of the disclosure. At 502, it may be determined that a device may access a second cell which may result in a routing area update. In an implementation, a change in location area (LA) may be implied with a change in Routing Area (RA) since an RA identifier may be a subset of a Location Identity (ID). As such, whenever a device is located in a situation where LA updating is beneficial, the device may also perform RA updating. Further, the device may choose to do both procedures using a combined RA/LA updating procedure in UTRAN networks operating in NMO I, or the UE performs the LA and RA updating procedures separately (but in parallel) in NMO II networks. At 504, it may be determined if the change in cell is due to MT CSFB processing. In an implementation, a device camped on an LTE network may maintain a connection with a Circuit Switched (CS) network to process voice calls.

In an aspect of the disclosure, if at 504 it is determined that the cell change is due to MT CSFB processing, then at 506 a PS data pending flag may be activated (e.g., set to true) in an RA update (RAU) message. In an implementation, the PS data pending flag may be a follow on proceed flag. In another implementation, the UE may set the Follow-on Proceed flag in the RAU message if the UE has transitioned to a UTRAN/GERAN cell in response to a MT CS page received on an E-UTRAN cell.

By contrast, in another aspect of the disclosure, if at 504 it is determined that the cell change was not due to MT CSFB processing, then at 508 it is determined whether the device has any pending uplink data packets. In an implementation, a follow-on proceed flag may be used in a RA update request when the UE has pending uplink data. The Follow-on Proceed flag may be different from the Follow-on Request flag discussed above. A Follow-on procedure may not reach the MSC2, but rather it may be destined for a PS core entity, such as a SGSN, to instruct the SGSN in the PS domain to retain a connection in anticipation of uplink user data.

When the device includes the Follow-on Proceed flag in the RAU message, the flag instructs the network to maintain the RAN level connection because, in anticipation of uplink user data, the SGSN does not instruct the RAN to release the connection. This may allow time for the GMSC to re-route a page to MSC2 so that it may be delivered to the UE over UTRAN itself, and as such, improve the reliability of the MT CSFB calls. If at 508 it is determined the device does have pending data packets, then at 506 a PS data pending flag may be activated in an RA update message. In an implementation, the PS data pending flag may be included in a combined RAU/LAU message when a network in operating in a network mode of operation I (NMO I). In another implementation, the PS data pending flag may be associated with a separate RAU in NMO II. By contrast, if at 508 it is determined that there is no pending PS data packets, then at 510 a RA update may be transmitted with the PS data pending flag not active (e.g., set to false).

Figure 6A:
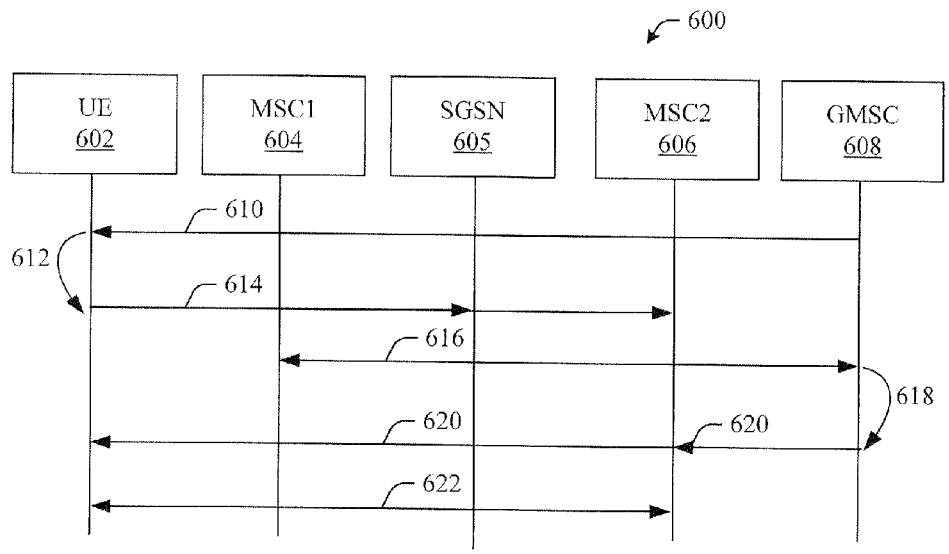
FIGS. 6A and 6B show diagrams illustrating various call flows of a communication network, in accordance with aspects of the disclosure.
Figure 6B:
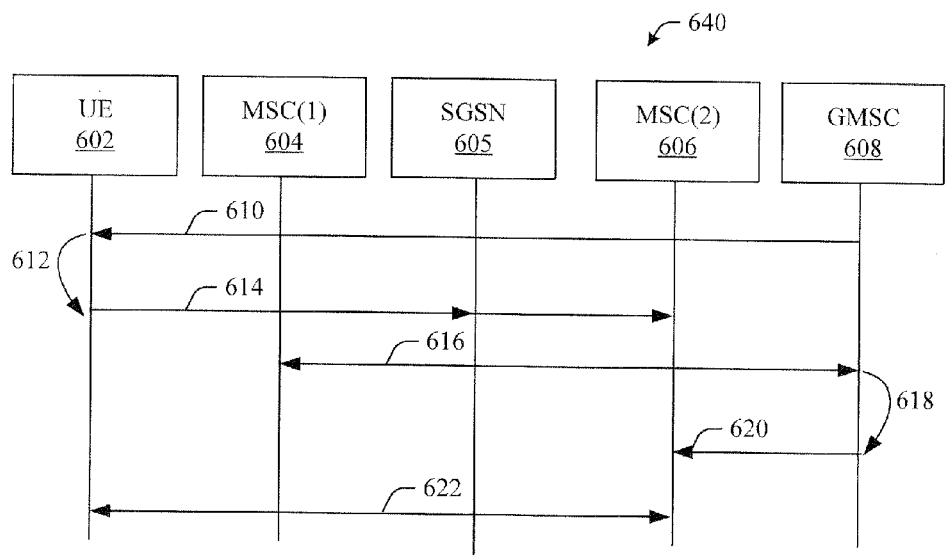

FIGS. 6A and 6B show diagrams illustrating various call flows in a communications system 600 operable for supporting peer to place communications, in accordance with aspects of the disclosure. The communication system 600 may include a UE 602, an MSC1 604, an MSC2 606, and a GMSC 606. It should be appreciated that the process flow described in reference to FIGS. 6A and 6B may be implemented on various different networks, such as UTRAN, GERAN, etc.

Referring to FIG. 6A, at 610, a paging message is received by UE 602 associated with CSFB processing. In an implementation, UE 602 may be camped on an LTE cell and may have an established Routing Area Network (RAN) connection for CSFB with MSC1 604. In another implementation, the page may be received from GMSC 608 delivered to UE 602 by MSC1 604. At 612, it may be determined that UE 602 has accessed a cell with a different location LA2 prior to being able to respond to the page. For example, when UE 102 performs a location updating procedure on LA2, MSC2 606 may not be aware that UE 602 has moved to LA2 as a result of a page received from MSC1 604. In other words, during a time between receiving a page from MSC1 604 and accessing a CS base cell, UE 602 may have moved such that the CS based cell is supported by MSC2 606.

Referring to FIG. 6A, at 614, UE 602 may communicate with MSC2 606 serving LA2. In an implementation, the communications may include a Routing Area Update (RAU)

message with a follow-on proceed flag activated. Further, the RAU message reaches SGSN 605, and as such, the follow-on proceed flag only reaches SGSN 605. If the RAU message was used to perform combined RA/LA update procedure, SGSN 605 performed the location updating for UE 602 with MSC2 606, while if the RAU was not performing combined RA/LA updating procedure and only updating RA, UE 602 in parallel does separate LA updating procedure. When a device (e.g., UE 602) includes the Follow-on Proceed flag in the RAU message, the Follow-on Proceed flag directs the network to maintain the RAN level connection because, in anticipation of uplink user data indicated by the Follow-on Proceed flag, SGSN 605 does not instruct the RAN to release the connection. This may allow time for GMSC 608 to re-route the page to MSC2 606 so that it may be delivered to UE 602 over UTRAN itself, and as such, improving the reliability of the MT CSFB calls.

Referring to FIG. 6A, at 616, a roaming retry procedure may be performed in which MSC1 604, MSC2 606, and GMSC 608 exchange messages indicating that UE 602 is now associated with MSC2 606. In an implementation, the message may include a roaming retry procedure. At 618, GMSC 608 determines that the paging message may be re-routed so that the paging message is transmitted to UE 602 through MSC2 606. At 620, GMSC 608 transmits the paging message to UE 602 through MSC2 606. Thereafter, at 622, MSC2 606 and UE 602 perform MT CSFB setup procedures, and a call may be established.

In an aspect of the disclosure, paging at 620 may be optional. For example, referring to FIG. 6B, at 616, a roaming retry procedure may be performed in which MSC1 604, MSC2 606, and GMSC 608 exchange messages indicating that UE 602 is associated with MSC2 606. At 618, GMSC 608 may determine that the paging message does not need to be re-routed to UE 602 because GMSC 608 has determined that connection of UE 602 to MSC1 604 has been released, and a connection of UE 602 to MSC2 606 has been established. Thus, in an implementation, a paging message is not necessary to transmit to UE 602 via MSC2 606, in a manner as described in reference to FIG. 6A. However, in another implementation, at 620, GMSC 608 may transmit a paging message to MSC2 606 to confirm that MSC2 606 is connected to UE 602. Thereafter, at 622, MSC2 606 and UE 602 may perform MT CSFB setup procedures, and a call may be established.

Figure 7:
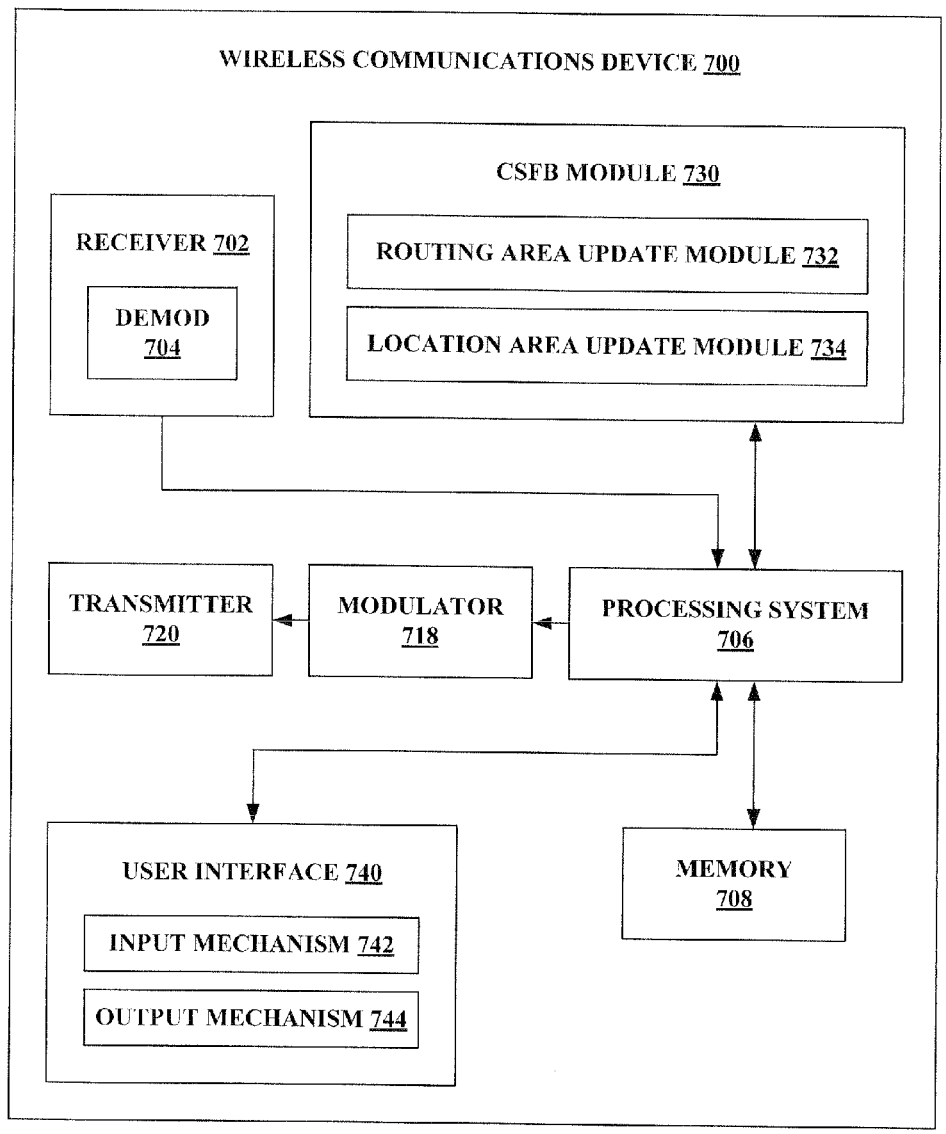
FIG. 7 shows a diagram illustrating an example architecture of a wireless communication device, in accordance with aspects of the disclosure.

FIG. 7 shows a diagram illustrating an embodiment of a hardware implementation for an apparatus 700 employing a processing system 706 and a memory 708, in accordance with aspects of the disclosure. In various implementations, the apparatus 700 comprises an example of one or more of the wireless communication devices of FIG. 1. As shown in FIG. 7, the wireless communication device 700 comprises a receiver 702 that receives a signal from, for instance, a receive antenna (not shown), performs actions on (e.g., filters, amplifies, downconverts, etc.) the received signal, and digitizes the conditioned signal to obtain samples. The receiver 702 may comprise a demodulator 704 that may demodulate received symbols and provide them to the processing system 706 for channel estimation. The processing system 706 may comprise one or more processors configured for analyzing information received by the receiver 702 and/or for generating information for transmission by a transmitter 720. In an implementation, the processing system 706 may comprise one or more processors configured to control one or more components of the wireless communication device 700. In another implementation, the processing system 706 may comprise one or more processors configured to analyze information received by the receiver 702, generate information for transmission by the transmitter 720, and/or control one or more components of the wireless communication device 700.

The wireless communication device 700 comprises the memory 708 that is operatively coupled to the processor 706. The memory 708 may be configured to store data to be transmitted, received data, information related to available channels, data associated with analyzed signal and/or interference strength, information related to an assigned channel, power, rate, or the like, and any other suitable information for estimating a channel and communicating via the channel. The memory 708 may be configured to store protocols and/or algorithms associated with estimating and/or utilizing a channel (e.g., performance based, capacity based, etc.).

Further, the processor 706 may provide means for determining that a device is switching from a first location and a first cell to a circuit switched (CS) cell with a second location to implement a mobile terminated (MT) CS fallback (CSFB) process, means for generating a routing area (RA) update message including a flag indicating a pending data packet for communication, and means for transmitting the generated RA update message.

It should be appreciated that data store (e.g., memory 708) described herein may be either volatile memory or nonvolatile memory, or may include both volatile and nonvolatile memory. By way of illustration, and not limitation, nonvolatile memory may include read only memory (ROM), programmable ROM (PROM), electrically programmable ROM (EPROM), electrically erasable PROM (EEPROM), or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

In an implementation, the wireless communication device 700 may further include a CSFB module 730 to facilitate enabling MT CSFB for the wireless communication device 700 located such that a CS based cell is served by a MSC with a different locating area than a LTE serving cell. In an implementation, the CSFB module 730 may include a routing area update module 732 and a locating area update module 734. The CSFB module 720 may be operable to a change in LA using locating area update module 734 and a change in routing area RA using routing area update module 723. In an implementation, the RA may be implied since the RA identifier is a subset of a Location identity. As such, whenever a device is located in a situation where LA updating is beneficial, the device may also perform RA updating. Further, the wireless communication device 700 may choose to do both procedures using a combined RA/LA updating procedure in UTRAN networks operating in NMO I, or the UE performs the LA and RA updating procedures separately (but in parallel) in NMO II networks. At 304, it is determined if the change in cell is due to MT CSFB processing.

In an implementation, the wireless communication device 700 may include a user interface 740. The user interface 740 may include input mechanisms 742 for generating inputs into the wireless communication device 700, and an output mechanism 742 for generating information for consumption by the user of the wireless communication device 700. For example, the input mechanism 742 may include a mechanism, such as a key or keyboard, a mouse, a touch-screen display, a microphone, etc. In an example, the output mechanism 744 may include a display, an audio speaker, a haptic feedback mechanism, a Personal Area Network (PAN) transceiver etc. In the illustrated embodiments, the output mechanism 744 may include a display operable to present media content that is in image or video format or an audio speaker to present media content that is in an audio format.

Figure 8:
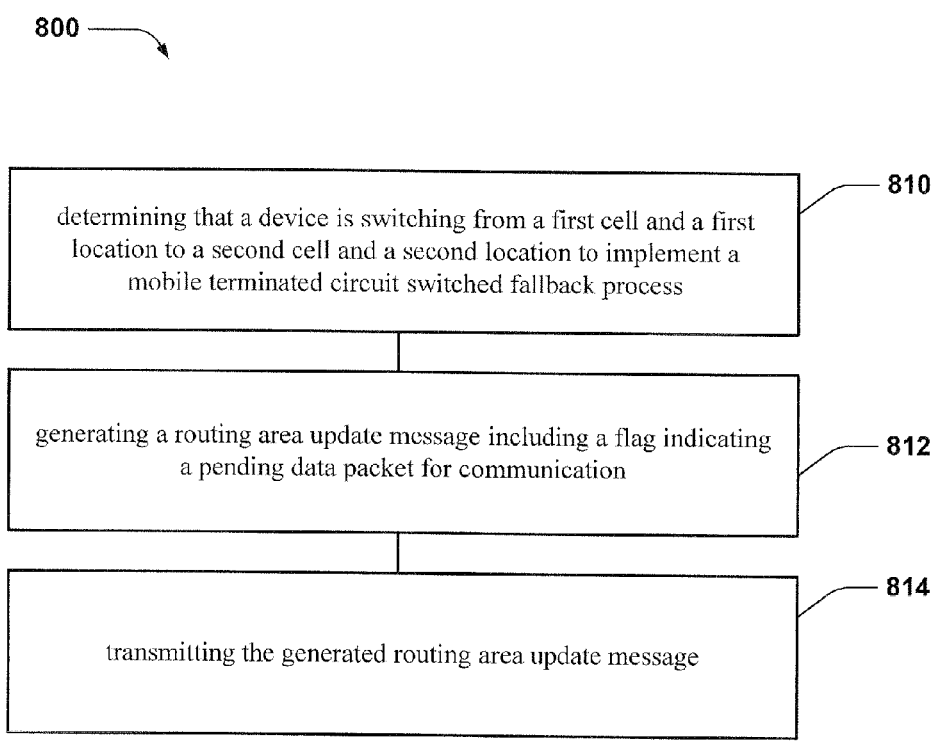
FIG. 8 is a diagram illustrating an embodiment of a process flow for a method of improving reliability of Circuit Switched Fallback (CSFB) in a wireless communication system, in accordance with aspects of the disclosure.

FIG. 8 is a diagram 800 illustrating an embodiment of a process flow for a method of improving reliability of Circuit Switched Fallback (CSFB) in a wireless communication system, in accordance with aspects of the disclosure.

Referring to FIG. 8, at 810, the method is configured for determining that a device is switching from a first cell and a first location to a second cell and a second location to implement a mobile terminated circuit switched fallback process. At 812, the method is configured for generating a routing area update message including a flag indicating a pending data packet for communication. At 814, the method is configured for transmitting the generated routing area update message.

In an implementation, the device comprises user equipment (UE) that is configured to communicate with a first mobile switching centre (MSC) associated with the first cell and a second MSC associated with the second cell. The device may not have any pending data packets for communication even though the flag indicates that there are pending data packets for communication.

In an implementation, the method may be configured for releasing connection to the device by the second cell, transmitting a paging message to the device via the second cell, establishing connection of the device to the second cell, and performing a call setup procedure.

In an implementation, the method may be configured for delaying release of connection to the device by the second cell for a period of time and performing a call setup procedure.

In an implementation, the method may be configured for exchanging one or more roaming retry messages with at least one of a first MSC associated with the first cell, a second MSC associated with the second cell, and a gateway MSC (i.e., GMSC). The one or more roaming retry messages may indicate that the device is associated with the second MSC. The second MSC may receive an indication for a pending mobile terminated (MT) call.

Figure 9:
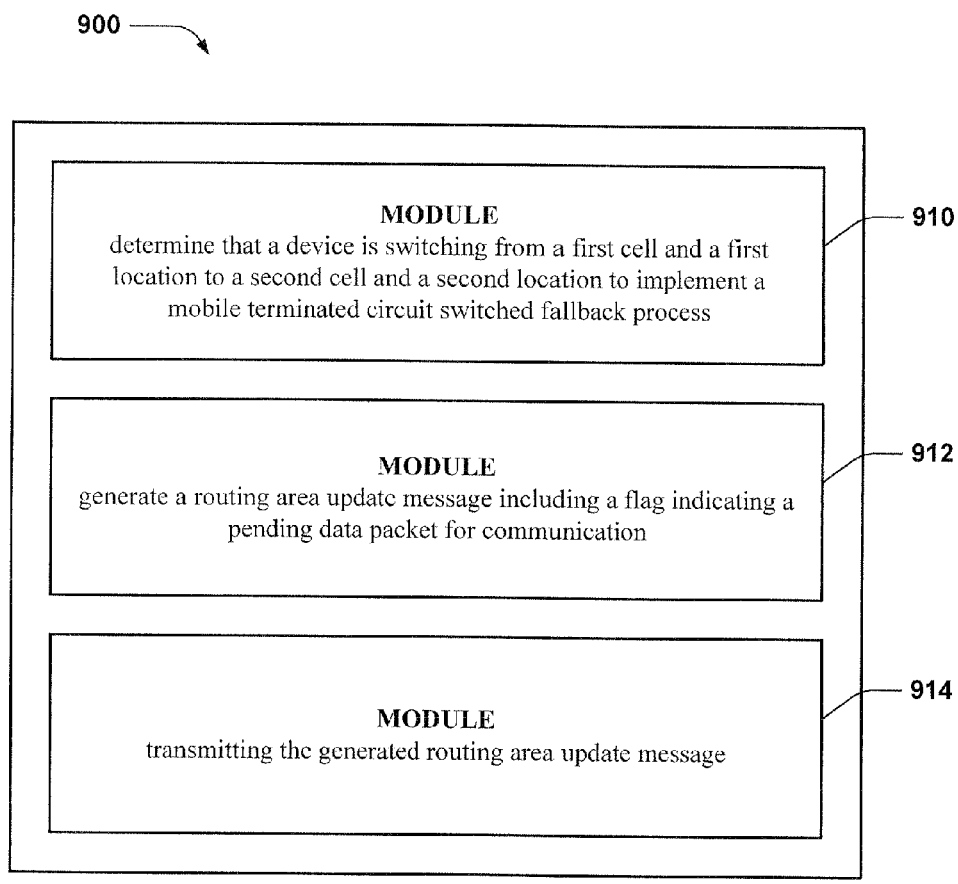
FIG. 9 is a diagram illustrating an embodiment of functionality of an apparatus configured to facilitate wireless communication, in accordance with aspects of the disclosure.

FIG. 9 is a diagram 900 illustrating an embodiment of functionality of an apparatus (e.g., the apparatus 700 of FIG. 7) configured to facilitate wireless communication, in accordance with aspects of the disclosure.

Referring to FIG. 9, the apparatus includes a module 910 configured for determining that a device is switching from a first cell and a first location to a second cell and a second location to implement a mobile terminated circuit switched fallback process. The apparatus includes a module 912 configured for generating a routing area update message including a flag indicating a pending data packet for communication. The apparatus includes a module 914 configured for transmitting the generated routing area update message. The apparatus may include additional modules that perform each of the steps in the aforementioned flow charts. As such, each step in the aforementioned flow charts may be performed by a module and the apparatus may include one or more of those modules.

In an implementation, the device comprises user equipment (UE) that is configured to communicate with a first mobile switching centre (MSC) associated with the first cell and a second MSC associated with the second cell. The device may not have any pending data packets for communication even though the flag indicates that there are pending data packets for communication.

In an implementation, the apparatus may include a module configured for releasing connection to the device by the second cell, a module configured for transmitting a paging message to the device via the second cell, a module configured for establishing connection of the device to the second cell, and a module configured for performing a call setup procedure.

In an implementation, the apparatus may include a module configured for delaying release of connection to the device by the second cell for a period of time and a module configured for performing a call setup procedure.

In an implementation, the apparatus may include a module configured for exchanging one or more roaming retry messages with at least one of a first MSC associated with the first cell, a second MSC associated with the second cell, and a gateway MSC (i.e., GMSC). The one or more roaming retry messages may indicate that the device is associated with the second MSC. The second MSC may receive an indication for a pending mobile terminated (MT) call.

Referring to FIG. 7, in a configuration, the apparatus 700 configured for wireless communication comprises the processing system 706 configured to provide a means for determining that a device is switching from a first cell and a first location to a second cell and a second location to implement a mobile terminated circuit switched fallback process, a means for generating a routing area update message including a flag indicating a pending data packet for communication, and a means for transmitting the generated routing area update message.

In an implementation, the device comprises user equipment (UE) that configured to communicate with a first mobile switching centre (MSC) associated with the first cell and a second MSC associated with the second cell. The device may not have any pending data packets for communication even though the flag indicates that there are pending data packets for communication.

In an implementation, the processing system 706 may be configured to provide a means for releasing connection to the device by the second cell, a means for transmitting a paging message to the device via the second cell, a means for establishing connection of the device to the second cell, and a means for performing a call setup procedure.

In an implementation, the processing system 706 may be configured to provide a means for delaying release of connection to the device by the second cell for a period of time and a means for performing a call setup procedure.

In an implementation, the processing system 706 may be configured to provide a means for exchanging one or more roaming retry messages with at least one of a first MSC associated with the first cell, a second MSC associated with the second cell, and a gateway MSC (i.e., GMSC). The one or more roaming retry messages may indicate that the device is associated with the second MSC. The second MSC may receive an indication for a pending MT call.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which may be a wired terminal or a wireless terminal. A terminal may also be called a system, device, subscriber unit, subscriber station, mobile station, mobile, mobile device, remote station, remote terminal, access terminal, user terminal, terminal, communication device, user agent, user device, or UE. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. It is also to be understood and appreciated that a combination of these approaches may be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. In an implementation, a processor may also be implemented as a combination of computing devices, e.g., a combination of a DSP and a microprocessor, a plurality of microprocessors, one or more microprocessors in conjunction with a DSP core, or any other such configuration. In another implementation, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor may read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for wireless communication in a device, comprising:
    switching from a first cell associated with a first mobile switching centre that provides coverage to a first geographical area to a second cell associated with a second mobile switching centre that provides coverage to a second geographical area to implement a mobile terminated circuit switched fallback process;
    generating a routing area update message including a flag indicating a pending data packet for communication, wherein the flag comprises a Follow-On Proceed flag;
    transmitting the generated routing area update message;
    when the flag indicates a pending data packet;
        maintaining a connection to the second cell for a period of time, and
        performing a call setup procedure;
    when the flag does not indicate a pending data packet;
        releasing connection to the second cell;
        receiving a paging message at the device;
        establishing connection to the second cell;
        performing a call setup procedure.

2. The method of claim 1, wherein the device is configured to communicate with the first mobile switching centre associated with the first cell and the second mobile switching centre associated with the second cell.

3. The method of claim 1, further comprising exchanging one or more roaming retry messages with at least one of the first mobile switching centre associated with the first cell, the second mobile switching centre associated with the second cell, and a gateway mobile switching centre.

4. The method of claim 3, wherein the one or more roaming retry messages indicates that the device is associated with the second mobile switching centre.

5. The method of claim 3, wherein the second mobile switching centre receives an indication for a pending mobile terminated call.

6. The method of claim 1, wherein the device does not have any pending data packets for communication even though the flag indicates that there are pending data packets for communication.

7. The method of claim 1, wherein the first cell is a Long Term Evolution (LTE) based cell.

8. The method of claim 1, wherein the second cell is a Universal mobile telecommunications system Terrestrial Radio Access Network (UTRAN) based cell.

9. An apparatus for wireless communication, comprising:
    A memory;
    A processing system;
    Said processing system, in communicating with said memory, configured to:
    switch from a first cell associated with a first mobile switching centre that provides coverage to a first geographical area to a second cell associated with a second mobile switching centre that provides coverage to a second geographical area to implement a mobile terminated circuit switched fallback process;
    generate a routing area update message including a flag indicating a pending data packet for communication, wherein the flag comprises a Follow-On Proceed flag;
    transmit the generated routing area update message:
    when the flag indicates a pending data packet;
        maintain a connection to the second cell for a period of time, and
    perform a call setup procedure; when the flag does not indicate a pending data packet;
        release connection to the first cell; receive a paging message at the apparatus establish connection of the apparatus to the second cell;
        perform a call setup procedure.

10. The apparatus of claim 9, wherein the apparatus is configured to communicate with the first mobile switching centre associated with the first cell and the second mobile switching centre associated with the second cell.

11. The apparatus of claim 9, wherein the processing system is further configured to exchange one or more roaming retry messages with at least one of the first mobile switching centre associated with the first cell, the second mobile switching centre associated with the second cell, and a gateway mobile switching centre.

12. The apparatus of claim 11, wherein the one or more roaming retry messages indicates that the apparatus is associated with the second mobile switching centre.

13. The apparatus of claim 11, wherein the second mobile switching centre receives an indication for a pending mobile terminated call.

14. The apparatus of claim 9, wherein the apparatus does not have any pending data packets for communication even though the flag indicates that there are pending data packets for communication.

15. The apparatus of claim 9, wherein the first cell is a Long Term Evolution (LTE) based cell.

16. The apparatus of claim 9, wherein the second cell is a Universal mobile telecommunications system Terrestrial Radio Access Network (UTRAN) based cell.

17. An apparatus for wireless communication, comprising:
    means for switching from a first cell associated with a first mobile switching centre that provides coverage to a first geographical area to a second cell associated with a second mobile switching centre that provides coverage to a second geographical area to implement a mobile terminated circuit switched fallback process;
    means for generating a routing area update message including a flag indicating a pending data packet for communication, wherein the flag comprises a Follow-On Proceed flag;
    means for transmitting the generated routing area update message;
    means for maintaining a connection to the second cell for a period of time when the flag indicates a pending data packet;
    means for performing a call setup procedure, and
    means for releasing connection to the first cell when the flag does not indicate a pending data packet;
    means for establishing connection to the second cell;
    means for receiving a page at the device;
    means for performing a call setup procedure.

18. The apparatus of claim 17, wherein the device is configured to communicate with the first mobile switching centre associated with the first cell and the second mobile switching centre associated with the second cell.

19. The apparatus of claim 17, further comprising means for exchanging one or more roaming retry messages with at least one of the first mobile switching centre associated with the first cell, the second mobile switching centre associated with the second cell, and a gateway mobile switching centre.

20. The apparatus of claim 19, wherein the one or more roaming retry messages indicates that the device is associated with the second mobile switching centre.

21. The apparatus of claim 19, wherein the second mobile switching centre receives an indication for a pending mobile terminated call.

22. The apparatus of claim 17, wherein the device does not have any pending data packets for communication even though the flag indicates that there are pending data packets for communication.

23. The apparatus of claim 17, wherein the first cell is a Long Term Evolution (LTE) based cell.

24. The apparatus of claim 17, wherein the second cell is a Universal mobile telecommunications system Terrestrial Radio Access Network (UTRAN) based cell.

25. A computer program product, comprising:
a non-transitory computer-readable medium comprising code executable to cause an apparatus to:
switch from a first cell associated with a first mobile switching centre that provides coverage to a first geographical area to a second cell associated with a second mobile switching centre that provides coverage to a second geographical area to implement a mobile terminated circuit switched fallback process;
generate a routing area update message including a flag indicating a pending data packet for communication, wherein the flag comprises a Follow-On Proceed flag;
transmit the generated routing area update message:
when the flag indicates a pending data packet;
maintain a connection to the second cell for a period of time; and
perform a call setup procedure;
when the flag does not indicate a pending data packet;
release connection to the first cell;
receive a paging message at the device;
establish connection of the device to the second cell;
perform a call setup procedure.

26. The computer program product of claim 25, wherein the device is configured to communicate with the first mobile switching centre associated with the first cell and the second mobile switching centre associated with the second cell.

27. The computer program product of claim 25, wherein the computer-readable medium further comprises code executable to cause the apparatus to exchange one or more roaming retry messages with at least one of the first mobile switching centre associated with the first cell, the second mobile switching centre associated with the second cell, and a gateway mobile switching centre.

28. The computer program product of claim 27, wherein the one or more roaming retry messages indicates that the device is associated with the second mobile switching centre.

29. The computer program product of claim 27, wherein the second mobile switching centre receives an indication for a pending mobile terminated call.

30. The computer program product of claim 25, wherein the device does not have any pending data packets for communication even though the flag indicates that there are pending data packets for communication.

31. The computer program product of claim 25, wherein the first cell is a Long Term Evolution (LTE) based cell.

32. The computer program product of claim 25, wherein the second cell is a Universal mobile telecommunications system Terrestrial Radio Access Network (UTRAN) based cell.

* * * * *